United States Patent
Steinetz et al.

(10) Patent No.: US 6,446,979 B1
(45) Date of Patent: Sep. 10, 2002

(54) ROCKET MOTOR JOINT CONSTRUCTION INCLUDING THERMAL BARRIER

(75) Inventors: Bruce M. Steinetz, Westlake, OH (US); Patrick H. Dunlap, Jr., Willowick, OH (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 156 days.

(21) Appl. No.: 09/613,053

(22) Filed: Jun. 27, 2000

Related U.S. Application Data (60) Provisional application No. 60/144,353, filed on Jul. 9, 1999.

(51) Int. Cl.$^7$ ................................................ F16J 15/10
(52) U.S. Cl. ....................... 277/630; 277/641; 277/652; 277/654; 277/537; 277/938; 239/265.11
(58) Field of Search ................................... 277/630, 641, 277/650.2, 654, 938, 536.8, 539; 239/265.11

(56) References Cited

U.S. PATENT DOCUMENTS

| | | | | |
|---|---|---|---|---|
| 1,078,333 | A | * | 11/1913 | Cole |
| 2,716,034 | A | * | 8/1955 | Main |
| 2,915,110 | A | | 12/1959 | Ferguson et al. |
| 3,791,658 | A | * | 2/1974 | Zumeta et al. |
| 4,156,533 | A | | 5/1979 | Close et al. |
| 4,180,211 | A | * | 12/1979 | Olcott et al. ............ 239/265.43 |
| 4,219,203 | A | | 8/1980 | Bellavia, Jr. et al. |
| 4,441,726 | A | | 4/1984 | Uhl |
| 4,559,862 | A | * | 12/1985 | Case et al. |
| 4,576,081 | A | * | 3/1986 | Felthuis et al. .................... 87/6 |
| 4,659,410 | A | * | 4/1987 | McDowell et al. .......... 156/277 |
| 4,848,778 | A | * | 7/1989 | von Pragenau |
| 4,917,302 | A | | 4/1990 | Steinetz et al. |

(List continued on next page.)

FOREIGN PATENT DOCUMENTS

| JP | 11-336911 | * 12/1999 |
|---|---|---|

OTHER PUBLICATIONS

"Report of the Presidential Commission on the Space Shuttle Challenger Accident," Rogers, et al., p. 22–27, 40–81, (Jun. 1986).

"Fixing the Field Joint That Failed on the Challenger, " J. Propulsion, McDonald, vol. 7 (No.2), p. 130–138, (Mar. 1991).

"Space Shuttle Redesigned Solid Rocket Motor Field Joint Verification, " J. Propulsion, Perry, et al., vol. 7 (No. 2), p. 139–145, (Mar. 1991).

(List continued on next page.)

*Primary Examiner*—Anthony Knight
*Assistant Examiner*—Alison K. Pickard
(74) *Attorney, Agent, or Firm*—Kent N. Stone A thermal barrier for extremely high temperature applications consists of a carbon fiber core and one or more layers of braided carbon fibers surrounding the core. The thermal barrier is preferably a large diameter ring, having a relatively small cross-section. The thermal barrier is particularly suited for use as part of a joint structure in solid rocket motor casings to protect low temperature elements such as the primary and secondary elastomeric O-ring seals therein from high temperature gases of the rocket motor. The thermal barrier exhibits adequate porosity to allow pressure to reach the radially outward disposed O-ring seals allowing them to seat and perform the primary sealing function. The thermal barrier is disposed in a cavity or groove in the casing joint, between the hot propulsion gases interior of the rocket motor and primary and secondary O-ring seals. The characteristics of the thermal barrier may be enhanced in different applications by the inclusion of certain compounds in the casing joint, by the inclusion of RTV sealant or similar materials at the site of the thermal barrier, and/or by the incorporation of a metal core or plurality of metal braids within the carbon braid in the thermal barrier structure.

20 Claims, 4 Drawing Sheets

U.S. PATENT DOCUMENTS

| | | | |
|---|---|---|---|
| 4,961,991 A | | 10/1990 | Howard |
| 5,014,917 A | | 5/1991 | Sirocky et al. |
| 5,082,293 A | | 1/1992 | Steinetz et al. |
| 5,301,595 A | | 4/1994 | Kessie |
| 5,332,239 A | | 7/1994 | Steinetz et al. |
| 5,335,466 A | * | 8/1994 | Langohr .................. 52/396.04 |
| 5,358,262 A | | 10/1994 | Roberts |
| 5,370,405 A | * | 12/1994 | Ueda |
| 5,370,926 A | * | 12/1994 | Hopper ........................ 428/241 |
| 5,518,255 A | | 5/1996 | Seike et al. |
| 5,779,151 A | * | 7/1998 | Sutton ................... 239/265.15 |
| 6,039,325 A | * | 3/2000 | Steinetz et al. ............. 277/633 |

OTHER PUBLICATIONS

"Redesigned Solid Rocket Motor Case–to–Nozzle Joint Development, " J. Propulsion, Cook, et al., vol. 7 (No. 2), p. 146–155, (Mar. 1991).

"Seal Testing of Large Diameter Rocket Motors," J. Propulsion, Moore, et al., vol. 7 (No. 2), p. 156–162, (Mar. 1991).

"Tungsten Wire Mesh Thermal Barrier for Large Solid Rocket Motor Joints, " AIAA 90–2080, Perry, p. 1–9, (Jul. 1990).

"Titan IV Solid Rocket Motor Upgrade Program at Alliant Techsystems Inc., " AIAA 97–2991, Foote, p. 1–5, (Jul 1997).

* cited by examiner

Construction Matrix

| Barrier Type | Size | Core | | | | Sheath | | | | | |
|---|---|---|---|---|---|---|---|---|---|---|---|
| | Diameter (in) | Material | Denier | Fiber Diameter (in) | Number of Yarns | Material | Denier | Fiber Diam (in) | Number of Layers | Number of Carriers per Layer | Number of Yarns per Bundle | Braid Angle (Degrees) |
| Carbon-1 | 0.114 | Grafil 34-700-12K | 7200 | $2.76 \times 10^{-4}$ | 4 | Thornel T-300 1K | 600 | $2.8 \times 10^{-4}$ | 5 | 8 | 1 | 45 |
| Carbon-2 | 0.125 | Grafil 34-700-12K 34-700 3K | 7200 1800 | $2.76 \times 10^{-4}$ | 1 1 | Thornel T-300 1K | 600 | $2.8 \times 10^{-4}$ | 10 | 8 | 1 | 45 |
| Carbon-2A | 0.125 | Grafil 34-700-12K 34-700 3K | 7200 1800 | $2.76 \times 10^{-4}$ | 1 1 | Thornel T-300 1K | 600 | $2.8 \times 10^{-4}$ | 9 | 8 | 1 | 45 |
| Carbon-3 | 0.200 | Grafil 34-700-12K | 7200 | $2.76 \times 10^{-4}$ | 10 | Thornel T-300 1K | 600 | $2.8 \times 10^{-4}$ | 5 | 12,12, 24,24,24 | 1 | 65 in 1st 60 in 5th |
| Carbon-4 | 0.200 | Amoco P25 2K | 2900 | $4.4 \times 10^{-4}$ | 21 | Thornel T-300 1K | 600 | $2.8 \times 10^{-4}$ | 5 | 12,12, 24,24,24 | 1 | 65 in 1st 60 in 5th |

ROCKET MOTOR JOINT CONSTRUCTION INCLUDING THERMAL BARRIER

This application claims the benefit of U.S. Provisional Application No. 60/144,353, filed Jul. 9, 1999.

ORIGIN OF THE INVENTION

The invention described herein was made by employees of the United States Government and may be manufactured and used by or for the Government of the United States of America for Governmental purposes without the payment of any royalties thereon or therefor.

TECHNICAL FIELD

This invention relates to sealing devices and more particularly to a rocket motor joint construction which includes a thermal barrier structure in conjunction with elastomeric primary and secondary O-ring seals between casings of a solid rocket motor.

BACKGROUND ART

Assembly joints of current solid rocket motor cases are generally sealed using high performance, elastomeric O-ring seals. The 5500° F. propulsion gases commonly produced during the relatively short firing interval of the rocket motors are kept a safe distance away from compounds are used to fill insulation gaps leading to the seals to prevent a flowpath of propulsion gases to the seals.

Normally, these two stages of protection are enough to prevent a direct flowpath of the 900-psi hot gases from reaching the seals. Occasionally, seals have experienced charring due to parasitic leakage paths that open up in the joint-fill compounds during rocket operation. Inspection during disassembly of Space Shuttle solid rocket motor nozzle joints from RSRM-44 and RSRM-45 revealed O-ring erosion of Joint 3 primary O-ring seals. Subsequent improvements in joint-fill compound application techniques have apparently overcome the Joint 3 charring problem. However, a number of nozzle joints including the nozzle-to-case joint and Joint 2 continue to show hot gas penetration through the joint-fill compound. The current nozzle-to-case joint design incorporates primary, secondary, and wiper (innermost) O-rings and polysulfide joint-fill compound. In the current design, one out of seven motors experiences hot gas to the wiper O-ring. Though the condition does not threaten motor safety, evidence of hot gas to the wiper O-ring results in extensive reviews before resuming flight. Because of the severe conditions which exist in a rocket motor firing environment, further assurance is desired that the joints and the primary and secondary O-ring seals therein are not jeopardized.

It is essential to design rocket motors and their casings to maximize the available thrust from the motor. Solid rocket motors are typically manufactured in sections for assembly in an elongated structure. Not only does the sectional design facilitate manufacture, but the casing sections can be retrieved after firing, refurbished, filled with fuel and reassembled for further firings.

Reusable rocket sections present additional design constraints in that after each firing the casings have experienced considerable stresses and have been exposed to environmental conditions which may change the properties and/or dimensions of the casing structure. The primary and secondary O-ring seals and any additional sealing components must be designed to accommodate such changes. This is in addition to the initial design constraints for the joint structure and the seals therein which may experience relative movement between casing sections due to vibration or the thrust forces produced by the rocket motor.

An additional design constraint imposed upon joint structures including the primary and secondary O-ring seal arrangement is that once the casing sections are assembled, the seals are buried within the structure at a location which is highly tolerant to the physical stresses imposed during motor firing, but not readily accessible to verify the integrity of the seal arrangement. The usual technique for verifying seal integrity is to provide a seal test port which extends between the primary and secondary seals. This test port when pressurized, provides an indication of sealing integrity of the seals under static conditions. However, the condition of materials and structures which make up the mechanical joint between rocket motor casing sections positioned radially inward of the O-ring seals, may have an effect upon pressurization of the seals. It is therefore important that any materials or structures placed radially inward of the O-ring seals must allow gas flow through them so as not to provide misinformation about the integrity of the seals (e.g., false positive) during pressure tests.

Much design and development activity has been directed to finding suitable materials and/or arrangements for the joint configuration between rocket motor casings. Such an arrangement must assure the primary sealing function of the O-ring seals is properly performed and yet accommodate those conditions which are imposed during firing conditions. It has been proposed to include a further thermal barrier structure in the joint between casing sections, radially inward of the primary and secondary O-ring seals. However existing materials have proven unsuitable for this purpose. Thus, there exists a need for a joint and seal structure for casing sections of a rocket motor which provides enhanced protection for the O-ring seals and greater assurance of joint integrity under firing conditions.

DISCLOSURE OF INVENTION

It is an object of the present invention to provide an improved thermal barrier, primarily for a rocket motor application.

It is a further object of the present invention to provide a thermal barrier which is used in conjunction with primary and secondary O-ring seals, including wiper seals, in rocket motor casing joints.

It is a further object of the present invention to provide an improved thermal barrier for rocket motors which can withstand rocket motor firing temperatures for a longer period of time.

It is a further object of the present invention to provide an improved thermal barrier for rocket motors that can drop the temperature of incoming jets of hot gas and spread these narrow jets to reduce their damaging effects on downstream O-rings.

It is a further object of the present invention to provide an improved thermal barrier for rocket motors which is of braided configuration and which allows pressurization of the main O-ring seals during rocket motor firing and which does not materially affect main seal integrity pressure tests before rocket firing.

It is a further object of the present invention to provide a casing joint for a rocket motor casing which has enhanced integrity and reliability.

These and other objects of the invention will become apparent in the following Best Modes for Carrying Out Invention and the appended claims.

Rocket motor propulsion gas temperatures reach a level on the order of 5500° F. The burn time in typical applications is of the order of only a few minutes. As flows of hot gases occur it is important to prevent such gases from impinging on the O-rings which seal adjacent rocket motor casing sections. Exposure to such hot gases can cause O-ring char and erosion limiting O-ring sealing ability and possibly leading to joint failure, as experienced in the loss of the Space Shuttle Challenger.

Rope seals have been developed previously and braided designs are used in gas turbine engine applications. In these applications the seals are commonly made of ceramic fibers and superalloy wires. These seals provide advantages not only as seals but also as compliant mounts under aggressive temperature and pressure requirements. However, these seals are generally being used in environments at peak temperatures in the 1500–2000° F. range. Such seals could not stand up for more than a few seconds to the 5500° F. temperatures commonly encountered in rocket motors. This is because ceramics have a melt temperature of about 3500° F. and common superalloy metals melt at about 2500° F.

It is a teaching of this invention that a braided rope type thermal barrier may be used to achieve advantages in rocket motor type applications. Such a barrier when comprised of carbon fibers provides superior protection to the primary and secondary O-ring seals (including wiper seals) of the motor and additional advantages to the joint structure between motor casing sections. Carbon fibers are used in an exemplary embodiment because of their relatively high heat conduction, low linear expansion coefficient, high corrosion resistance and thermal stability as well as their high strength and low density. It is known that carbon fibers oxidize and lose mass over long intervals when exposed to temperatures above 600–900° F. However it has been discovered that carbon fibers formed into a braided rope seal structure are able to withstand very high temperatures for a period of time which is even longer than the burn time of common rocket motors.

A series of tests have been performed to validate the efficacy of the carbon fiber braided rope thermal barrier of the invention including burn tests, temperature drop tests, flow tests, compression tests, and subscale motor tests. The results of the tests indicate that the carbon fiber braided rope thermal barrier of the invention provides adequate resiliency, a very high burn through capability, and a high resistance to hot gas flow. For example, in a 1/5 scale motor test, temperatures over 4200° F. were measured on the thermal barrier hot side, while temperatures on the cold side were just under 600° F. during rocket firing. This is within the temperature limits of the fluorocarbon rubber (Viton) type material conventionally used for primary and secondary O-rings in rocket motor applications. The thermal barrier of the invention reduces the temperature of incoming hot gas jets, spreads incoming jet flow, and blocks hot slag. The above test results have shown that the thermal barrier provides for great improvement in rocket motor casing joint structure.

The thermal barrier of an exemplary embodiment of the invention comprises essentially an axial carbon fiber central core, surrounded by one or more braid layers of carbon fibers. The thermal barrier is a large, circular, continuous member of relatively small cross sectional dimension, similar to an O-ring. The thermal barrier is disposed in a circular cavity positioned in the joint between rocket motor casing sections, radially inward of the primary and secondary O-ring seals of the motor.

The core of the thermal barrier may comprise a single axial strand or multiple axial strands of carbon fiber material disposed in a generally circular cross-sectional configuration. To facilitate flexibility fewer strands are used in the core. The braid layer or layers radially overlying the core preferably comprise carbon fiber strands surrounding the central core in a braided configuration, each layer sequentially encompassing the central core and any intermediate layers. Preferably, multiple braid layers are employed in lower denier fiber arrangements.

The advantages of such an improved thermal barrier arrangement are many-fold. For example, the use of carbon fiber is highly advantageous in resisting flame or burning at elevated temperatures compared to conventional materials. Thermal barriers of the invention made of carbon material last considerably longer than ceramic, superalloy or elastomeric materials in the severe rocket motor environment.

The structural integrity of the thermal barrier is virtually unchanged in the relatively short time interval in the rocket motor burn cycle during which the thermal barrier may be exposed to large pressure and/or heat transients. This interval is of the order of only several seconds (2–3 seconds) and corresponds to the time for the joint volume between the thermal barrier and the downstream O-rings to fill to the approximate 900 psi pressure within the rocket motor firing chamber. In addition, because of the permeable nature of the carbon thermal barrier structure, pressure equalization occurs across the thermal barrier. Because pressure is equal on both sides of the thermal barrier soon after firing is commenced, the flow of gas through the thermal barrier stops and little, if any, further heat is convected to the O-rings. As a result the O-rings are not subject to charring and erosion, and continue to fulfill their sealing function.

Even after being exposed to the extreme temperatures and pressures of the rocket motor environment, the carbon thermal barrier remains flexible and does not stiffen and/or become brittle as do the prior art ceramic and metal materials.

Formed in a configuration of many braided sheath layers and a relatively small, uniaxial core, the thermal barrier of the preferred form of the invention is more flexible than prior art braided rope configurations. This provides advantages in making it easier to lay and retain the thermal barrier location in the appropriate groove in the joint between casing sections, which facilitates assembly and reduces the chances of damage or misalignment of the thermal barrier. Greater flexibility also makes it easier to ship and store the thermal barrier prior to assembly.

The temperature drop achieved across the thermal barrier of the exemplary embodiment is outstanding. It has been determined in tests that a temperature gradient of the order of 2200° F. has occurred across the thermal barrier and has been maintained over relatively long intervals of time, with little or no damage occurring to the barrier structure. The thermal barrier thereby reduces the temperature of gases reaching the primary and secondary O-rings to a level which can be easily accommodated by the O-rings.

Possible heat paths through the thermal barrier have been identified in an effort to account for the large temperature drops that have been observed across the thermal barrier. It is believed that the thermal barrier may act as a "flame holder" and trap the thermal mass of the incoming hot gas jet within the braided structure.

As the jets of hot gases pass through the thermal barrier, the heat from these jets can go in several places. Heat from the jet is transferred to the carbon fibers. Some of this heat is conducted along the longitudinal axis of the thermal barrier and away from the heat source. The braided nature of the thermal barrier also spreads out the incoming hot gas jets and causes convection along the length of the thermal barrier. Heat can be transferred to the phenolic walls that surround the thermal barrier in the nozzle joint. This heat can be conducted to the phenolic walls by carbon fibers in the braid, or it can be transferred to the walls by convection from the hot gas that has spread over the thermal barrier. Heat can also be transferred to the phenolic walls through the process of charring the phenolic material. As the phenolic walls become charred, an endothermic reaction, energy is removed from the hot gas jet and the temperature of the gas is reduced. Any small amount of heat remaining in the gas is then transferred out of the thermal barrier and downstream to the O-rings.

Another method in which the thermal barrier acts to drop the temperature across its diameter is through the Joule-Thomson, or throttling, effect. As the hot, high pressure gases pass through small pores between the fibers in the thermal barrier and into the low pressure cavity downstream of the thermal barrier, the gas expands. This expansion causes an additional drop in the temperature of the gas and further reduces the amount of heat that reaches the downstream O-rings. This phenomenon helps to explain how such a large temperature drop occurs across the thermal barrier.

As noted, the improved thermal barrier of the invention has relatively high porosity, which allows leak tests of the primary and secondary O-ring seals to be accomplished without the necessity of a separate seal vent port or other constraints upon the leak test measurement. Further the relatively high porosity feature allows rapid pressurization of the primary and secondary seals under actual motor firing conditions.

While a thermal barrier structure having a generally circular cross-sectional configuration is described as an exemplary embodiment, it will be apparent that other cross-sectional configurations could be employed in other embodiments. Thus, the thermal barrier cross section could as well be square, triangular, rectangular, elliptical or circular, or a combination of these shapes as may be suited for different joint or cavity configurations, environmental conditions or operating conditions such as the need for additional physical support, a longer time interval of protection, a change in porosity or the like.

Various combinations of braid and core configurations can be utilized in embodiments of the invention, as can different numbers of braid layers, to achieve desired properties for the thermal barrier. Plural thermal barrier structures, where the barriers are disposed annularly side by side in the rocket casing joint are also within the teachings of this invention.

In further embodiments of the invention other materials may be added to the thermal barrier combination to achieve various results which enhance certain functions or properties of the thermal barrier. For example, room temperature vulcanized (RTV) sealant can be applied over the outer braid layer or layers of the thermal barrier to enhance the sealing effect and to achieve greater ease of assembly of the rocket motor sections and/or to reduce the porosity characteristics of the thermal barrier.

In still further embodiments of the invention materials such as copper or aluminum can be added to the thermal barrier structure to achieve various desired effects. For example if the core and/or one or more inner braid layers of the thermal barrier is formed of one of such metals, the latent heat of fusion of the metal is utilized so that the metal is sacrificed to maintain a high temperature differential across the thermal barrier. In this way the thermal barrier may withstand prolonged exposure to the hot gases of the rocket motor, providing additional time before the thermal barrier is affected. While molten metal may be deposited within the carbon braids of the thermal barrier, this will also provide the additional advantage of reducing the porosity of the thermal barrier when high porosity of the barrier is no longer desired. That is for example, at a time after initial pressurization of the primary and secondary O-ring seals and when less flow through the thermal barrier is desired, or in circumstances where pressure is being lost through the O-ring seals and it is desirable to minimize flow to prevent erosion and charring of the O-ring seals and possible joint damage. Numerous other advantages of the thermal barrier and joint structure of the invention will be apparent from the following description.

BEST MODES FOR CARRYING OUT THE INVENTION

Figure 1:
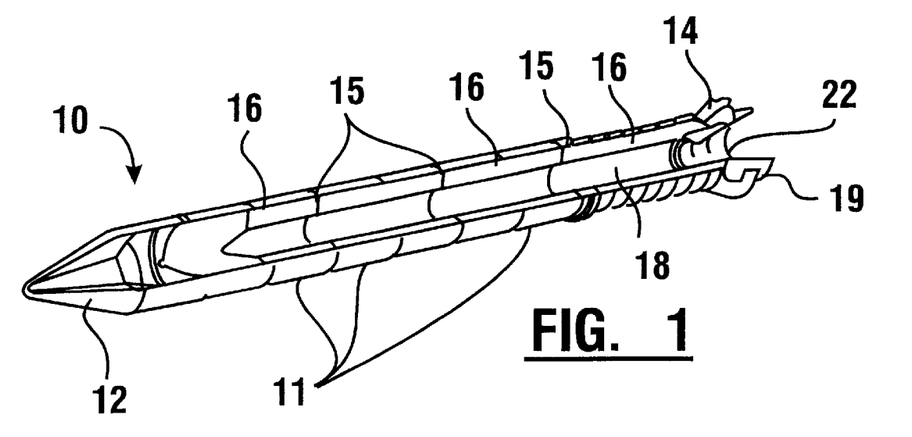
FIG. 1 is a perspective view of a solid rocket motor with parts cut away to show the interior of the motor and the segmented casing construction.

Referring now to the drawings there is shown in FIG. 1 a solid rocket motor 10 in which the teachings of an exemplary embodiment of the present invention are applied. Rocket motor 10 is segmented and comprised of a plurality of generally cylindrical casings or casing sections 11. A frustum or nose fairing 12 is located at the forward end. A nozzle 14 and thrust vector control system are located at the aft end. The casings 11 are axially aligned and joined to one another through casing joints 15 therebetween. The casings are lined inside with tubular sections of rocket propellant 16, forming a central chamber 18 for enabling axial flow of rocket combustion gases during the rocket burn. Rocket motor nozzle 14 is segmented and comprised of a plurality of generally cylindrical or conical nozzle segments or sections 19.

Figure 2:
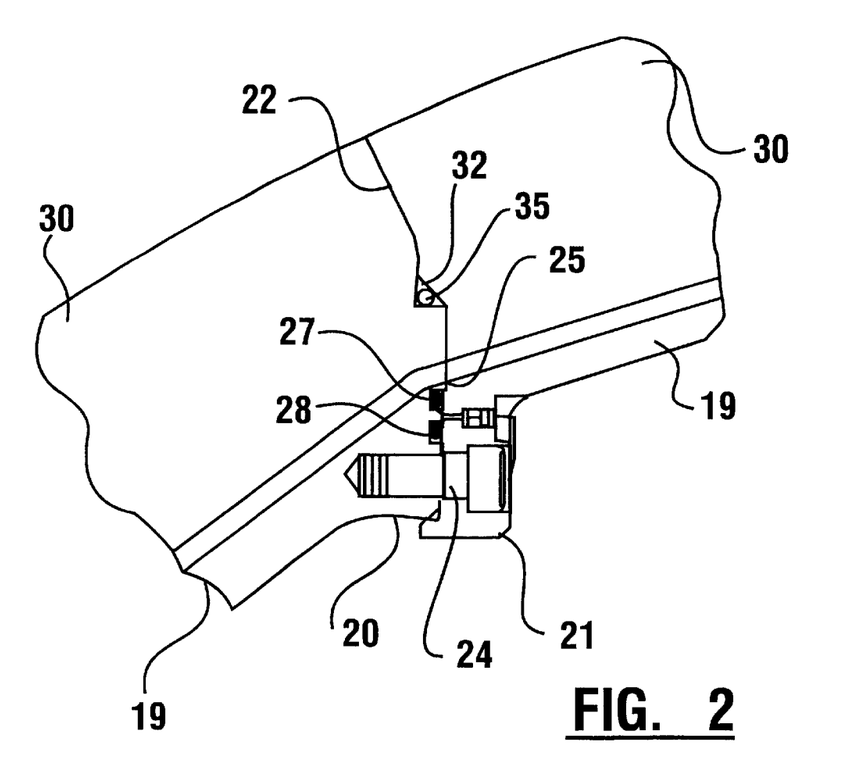
FIG. 2 is a cross-sectional view of a portion of the rocket motor of FIG. 1, showing a part of an exemplary joint between casing sections of the invention with a thermal barrier disposed in a groove in the joint.

In FIG. 2 is an enlarged view of a part of a lower casing joint 22 between adjacent nozzle segments 19. The joint 22 extends through mating flanges 20, 21 of forward and aft nozzle segments, respectively. Flanges 20, 21 are secured together by bolts 24 and have flat annular mating surfaces 25 therebetween. Radially inward of bolts 24 in the mating surface of flange 20 is a pair of annular grooves which receive the primary and secondary seals 27, 28, such as O-ring seals, respectively for that joint of the rocket nozzle 14. It should be understood that in the present invention the O-ring seals are not required to be of one-piece closed circular ring construction, but may comprise several components in forming a generally ring-like portion. For example, the seals may have a closed or non-closed oval shape or any other shape operative for use in the instant invention.

Radially inward of flanges 20, 21, nozzle segments 19 are lined with a tubular layer of phenolic or nitrile butyl rubber (NBR) insulation 30. The insulation extends from the inner periphery of nozzle segments 19 to an inner periphery of the insulation 30. At a location in joint 22, inwardly of nozzle segments 19 and within the area of insulation 30, is an annular groove 32. Groove 32 is sized to have a thermal barrier 35 positioned therein. In this embodiment of the invention, groove 32 is of a generally triangular configuration. The groove 32 is bounded by a pair of walls disposed at substantially right angles to one another bounding insulation 30 of the forward section and an abutting wall bounding the insulation in the aft section.

Thermal barrier 35 in the exemplary embodiment abuts each of the walls of cavity 32 and is compressed a desired extent to provide preload with the surrounding surfaces. This avoids fluid paths through the joint 22 around the thermal barrier. The thermal barrier due to its thermal resistance and porosity characteristics, provides a thermal barrier to protect the primary and secondary O-ring seals 27, 28. The thermal barrier may act as a seal. The configuration and disposition of groove 32 in this embodiment of the invention is exemplary of many different shapes possible for the groove or for location of the barrier 35 relative to the O-rings 27, 28. For example, in other embodiments groove 32 could be located entirely within casing 19, more closely adjacent seals 27, 28 and may be machined in the metal of the casing, rather than being formed in the insulation. The relative radial inward or outward location of the thermal barrier groove 32 in the joint has some effect upon the cooperation of the thermal barrier 35 with primary and secondary O-rings 27, 28. However, many configurations may be used in embodiments of the invention.

Figure 8:
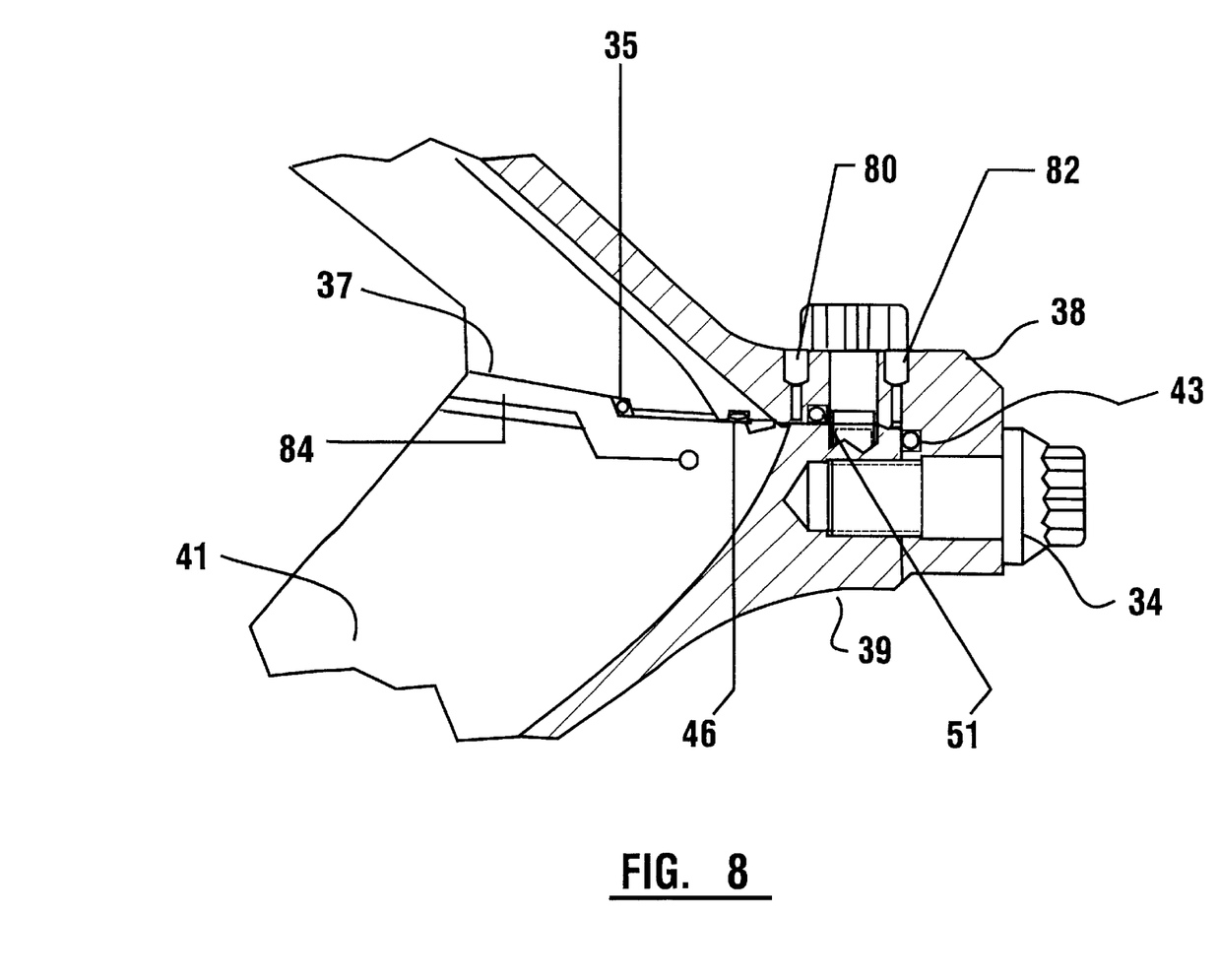
FIG. 8 shows an alternative exemplary embodiment of a joint of a rocket motor including a thermal barrier structure.

An alternative embodiment of a joint 37 is shown in FIG. 8. Joint 37 is a nozzle to casing joint of a rocket structure. As with the previously described joint, joint 37 includes a first flange 38 and a second flange 39. The flanges are held engaged by a plurality of radially extending bolts 34. The nozzle and casing sections adjacent joint 37 are lined with insulation 41, such as a tubular layer of insulation.

A primary O-ring 51 is positioned in a groove in a first annularly extending wall bounding the first flange 38. A secondary O-ring 43 is positioned in a groove in a second annularly extending wall bounding the first flange. In the exemplary embodiment the second wall extends generally perpendicular to the first wall. A wiper O-ring 46 is positioned radially inward of the primary O-ring 51 in a groove in the area of the insulation 41. In this embodiment a thermal barrier 35 is positioned in a contoured area of the joint 37 radially inward from the wiper seal 46. A vent port 80, a leak check port 82, and a J-leg 84 are also shown. The vent port and leak check port may be used in leak tests of seals.

Figure 3:
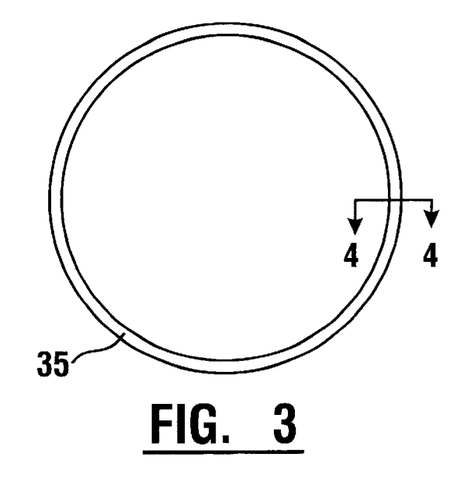
FIG. 3 is a plan view of the thermal barrier of an exemplary embodiment of the invention.
Figure 4:
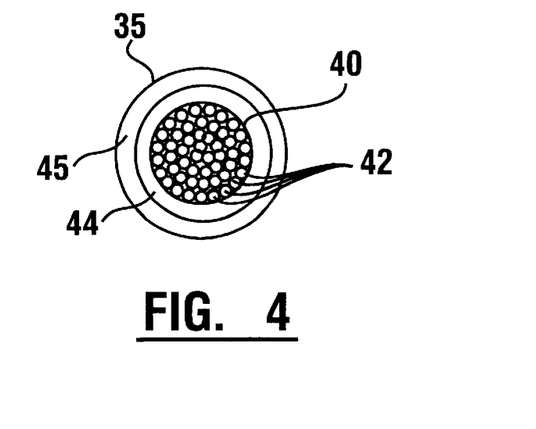
FIG. 4 is a cross-sectional view of the thermal barrier, taken at the line 4—4 of FIG. 3.

A plan view of the exemplary thermal barrier 35 is shown in FIG. 3 and a cross section is shown in FIG. 4, taken along the lines 4—4 of FIG. 3. The diameter of thermal barrier 35 as it extends about the casing of the rocket motor is very large relative to the cross-section dimension of the thermal barrier. The thermal barrier extends approximately the diameter of the nozzle segments 19 of rocket motor 10, which in the exemplary embodiment is of the order of about 8.5 feet.

The diameter of the cross section of the thermal barrier 35, best seen in FIG. 4 is on the order of one-quarter inch. Again, these dimensions may vary substantially, depending upon the application for the thermal barrier and the joint as well as different design parameters, which will be discussed hereafter.

Figure 5:
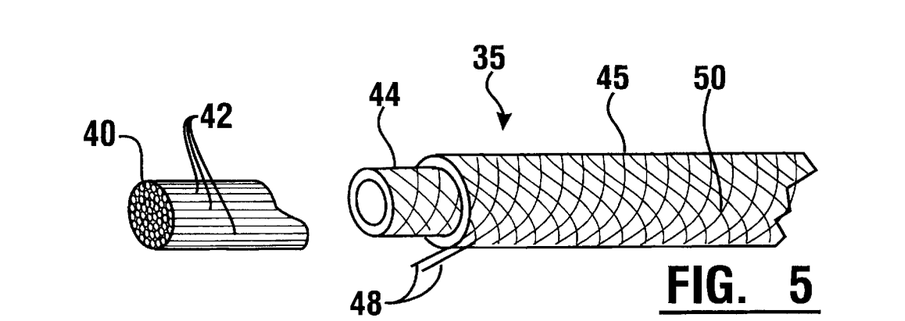
FIG. 5 is a schematic view in perspective of a portion of the thermal barrier of the invention.

Thermal barrier 35 includes a core 40 having one or a plurality of elongated carbon fiber strands 42. These strands are laid circumferentially adjacent one another in a generally circular bundle in the typical O-ring toroidal configuration. Core 40 is covered by first and second layers or sheaths 44, 45, respectively, comprised of carbon fiber strands 50 wound in a braided configuration. This arrangement is depicted schematically in FIG. 5 in a perspective view in which parts have been broken away for clarity. A pair of lines 48 are shown extending outwardly of the thermal barrier structure to depict an angle of lay of the fiber strands 50 with respect to the center of core 40.

Figure 7:
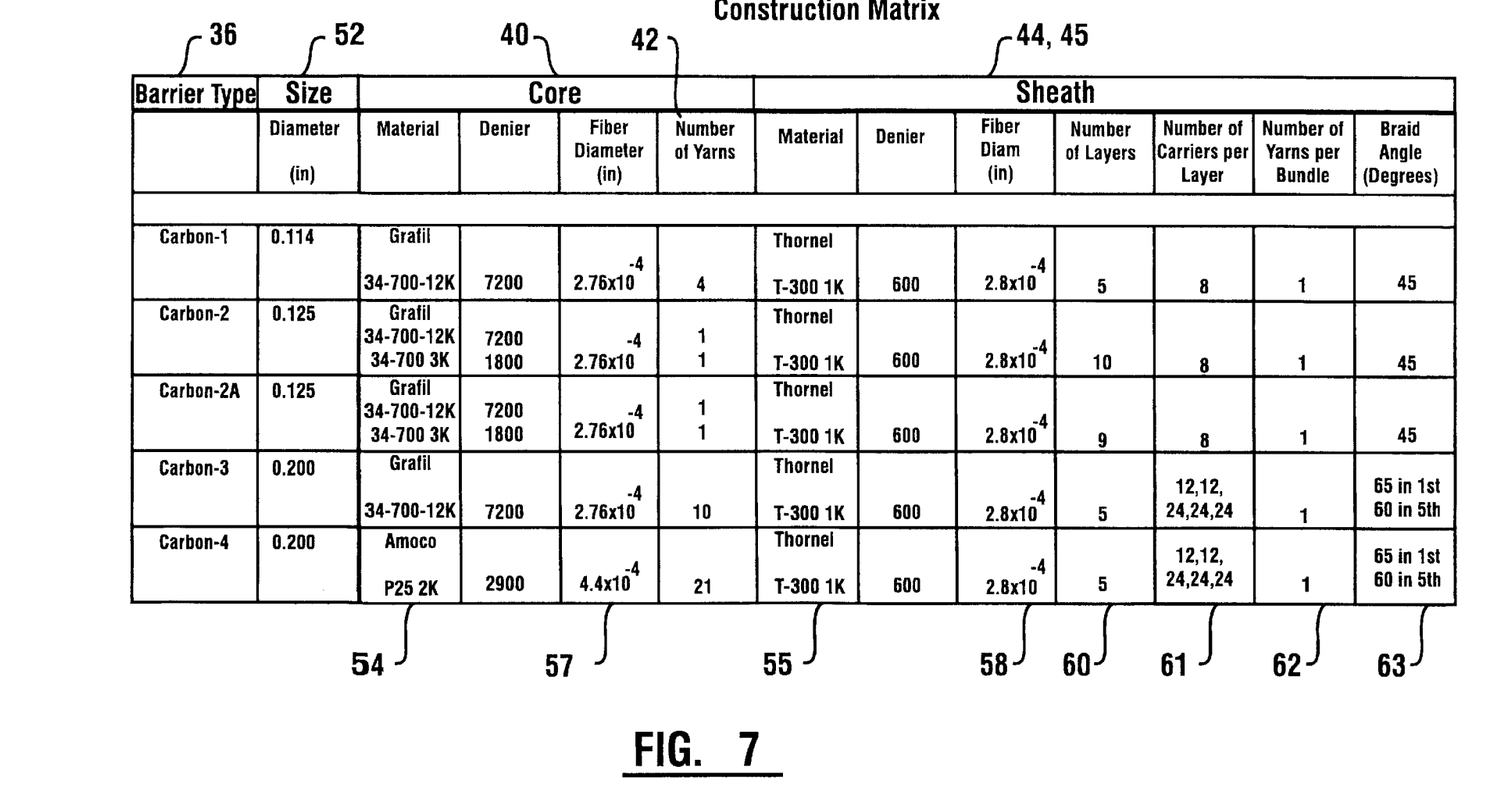
FIG. 7 is a table describing physical characteristics of several thermal barrier structures of embodiments of the invention.

A table is shown in FIG. 7. The table lists various parameters and properties of five embodiments of thermal barrier structures which have performed successfully in laboratory exposure or subscale rocket motor tests.

The five thermal barrier structure embodiments are listed in the column labeled 36 and are identified as Carbon 1, 2, 2A, 3 and 4. Overall thermal barrier diameters are listed in the next column 52. The core 40 of each thermal barrier type is described in the columns labeled Material, Denier, Fiber Diameter and Number of Yarns, the latter labeled 42 and corresponding to the strands 42 depicted in the drawings. The remainder of the table relates to sheath construction and to the sheaths 44, 45 shown in the drawings and is correspondingly labeled.

Reference is made in the material columns 54, 55 to the brands of carbon fibers used in the thermal barrier construction described for the core and sheath, respectively. The Grafil™ type fibers are a product of Grafil, Inc., those labeled Amoco® are a product of Amoco Performance Products, Inc., while Thornel™ refers also to a product of Amoco Performance Products, Inc. Fiber diameters are specified in columns 57, 58 while further characteristics of the sheaths 44, 45 are specified in columns 60–63. In this regard it should be noted that a much larger number of layers are specified in column 60 as constituting the sheath 44, 45, than shown and described in FIGS. 3–5. Braid angle is specified in column 63 in a range from 45–65 degrees. As noted, the thermal barrier constructions referred to in FIG. 7 are merely exemplary, those listed being some which have been constructed and tested. Many useful thermal barrier configurations may be developed following these teachings in many different combinations, depending upon the properties desired.

As noted, the construction of the thermal barrier 35 used in exemplary embodiments of the invention includes a core 40 and sheath layers 44, 45 which may be single or plural layers. The sheath is preferably formed as a braid of carbon fiber wound continuously along the length of core 40. The yarn wrap or braid angle 63 and number of carriers 61 can be altered to change the packing or density of the plurality of layers 44, 45.

The thermal resistance of the thermal barrier 35 can be changed by modification to the barrier structures and materials. For example, larger thermal barrier diameters, such as described in column 52, can be created to endure hot gases for a longer period of time, essentially by increasing the amount of fibrous carbon material that is blocking flow. Increasing thermal barrier density or packing factor also increases thermal resistance by minimizing the amount of surface area of carbon fibers available to be consumed by hot gases. The use of larger diameter carbon fibers in core 40 improves thermal resistance by reducing total surface area exposure.

Braiding properties. and techniques have an effect upon thermal resistance. Sheath 44, 45 can be braided using 3-D Multilayer Interlock Braiding (Albany International Techniweave Company). In this process, each sheath layer 44, 45 is intertwined with the layer above and below it, thereby preventing or delaying each sheath layer from being liberated from the rest of the thermal barrier as it is being cut through.

Another way to increase thermal resistance is to employ two or more stages of thermal barriers 35 in a side by side arrangement. These barriers may be positioned in a single groove or a pair of radially disposed grooves in exemplary joint structures. In this manner, the thermal barriers operate sequentially to afford an additional amount of time to hold off adverse effects of hot propulsion gases on O-rings and other joint structures.

Still another technique for improving thermal resistance of thermal barrier 35 is to add materials to the thermal barrier combinations that absorb heat provide oxidation resistance or which are consumed when exposed to hot combustion gases. This achieves additional time for operation of the carbon fiber thermal barrier configuration, under firing conditions. One technique for doing this is to coat or otherwise integrate into the thermal barrier, an agent such as welding flux that is consumed when exposed to hot combustion gases. This reduces the rate at which the carbon fibers are affected and improves thermal resistance. Another technique is to construct the innermost core 40 of certain metals or to include in the thermal barrier, one or more layers of a metal braid sheath which would then cover one or more underlying carbon fiber braid layers 44. In other embodiments metal and carbon fibers may be interwoven. The latent heat of fusion operates to improve thermal absorption which outward disposed O-rings. Copper and aluminum braids or twisted cores have been found to be useful for such purpose. As previously discussed, such materials may also change state to modify the porosity of the thermal barrier.

Figure 6:
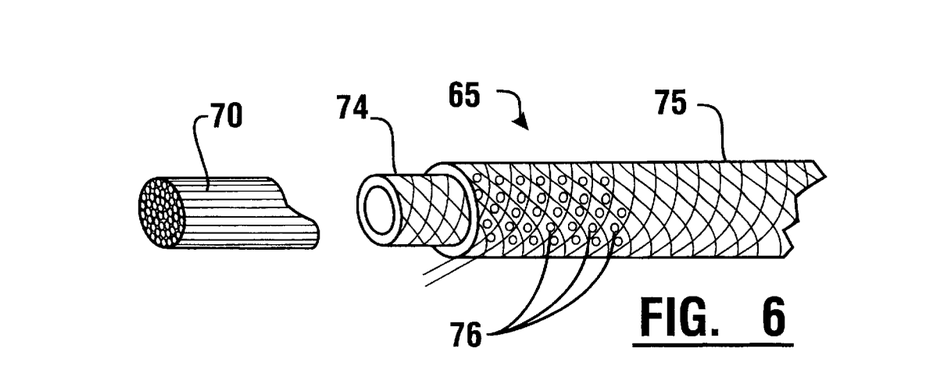
FIG. 6 is a schematic view in perspective of a portion of a modified thermal barrier structure.

Other thermal barrier characteristics can be modified to suit different given applications. For example, the thermal barrier 35 can be coated, infiltrated or soaked in RTV sealant or another pliable fill material. FIG. 6 shows such a thermal barrier configuration. Here thermal barrier 65 is essentially the same as that described in FIGS. 3–5, having a core 70, an inner braid layer 74 and an outer braid layer 75. A coating 76 of RTV material is depicted as being embedded in one or more of the plural sheath layers 74, 75. This coating 76 of RTV increases the amount of springback in the thermal barrier 65 and reduces the amount of permanent set that is experienced with repeated loading. The RTV coating 76 also increases the fluid flow resistance of thermal barrier 65 by filling in pores and gaps in sheath 75. Another way to increase thermal barrier resilience is to use twisted fibers in cores 40, 70 rather than the aligned fiber configuration. Other approaches to achieving desired thermal barrier properties will be apparent from the teachings herein.

It should be understood that the joint and thermal barrier structures shown and described herein are exemplary. Other joint and thermal barrier structures within the scope of the present invention will be apparent to those having skill in the art from the teachings herein.

Thus the rocket motor joint including thermal barrier of the invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A rocket motor joint construction comprising:
   an O-ring seal,
   a porous thermal barrier including
      a core,
         wherein the core comprises carbon content fiber strands circumferentially adjacent one another in a generally circular bundle,
      a sheath,
         wherein the sheath is adjacent to and surrounds the core,
         wherein the sheath comprises carbon content fiber strands wound in a braided configuration,
            wherein a braid angle of lay of fiber strands with respect to the center of the core is in the range of 45–65 degrees,
   wherein the thermal barrier is positioned radially inwardly of the O-ring seal, and wherein the thermal barrier provides thermal protection to the O-ring seal.

2. The rocket motor joint construction according to claim 1 including plural layered sheaths, wherein each sheath comprises carbon fiber strands wound in a braided configuration.

3. The rocket motor joint construction according to claim 2 including a layering of a lower sheath, a middle sheath, and an upper sheath, wherein the middle sheath is intertwined with the lower sheath and the upper sheath.

4. The rocket motor joint construction according to claim 2 wherein the core is uniaxial, and wherein the thermal barrier comprises a flexible resilient braided rope.

5. The rocket motor joint construction according to claim 1 wherein the thermal barrier includes at least one metal.

6. The rocket motor joint construction according to claim 5 wherein the thermal barrier includes copper or aluminum.

7. The rocket motor joint construction according to claim 1 wherein the thermal barrier includes a room temperature vulcanized sealant.

8. The rocket motor joint construction according to claim 1 wherein the core includes twisted fibers.

9. The rocket motor joint construction according to claim 1 including insulation radially inwardly of the O-ring seal, the insulation including a cavity, wherein the thermal barrier is positioned in the cavity.

10. The rocket motor joint construction according to claim 9 wherein the insulation comprises phenolic or nitrile butyl rubber insulation.

11. The rocket motor joint construction according to claim 9 wherein the cavity comprises a groove of generally triangular configuration.

12. The rocket motor joint construction according to claim 1 wherein the joint construction includes a joint between adjacent sections, wherein the adjacent sections comprise nozzle segments, and the joint comprises a nozzle to nozzle joint.

13. The rocket motor joint construction according to claim 1 wherein the joint construction includes a joint between adjacent sections, wherein the adjacent sections comprise nozzle and casing segments, and the joint comprises a nozzle to casing joint.

14. The rocket motor joint construction according to claim 1 wherein the joint construction includes joint between adjacent sections, wherein the adjacent sections comprise casing segments, and the joint comprises a nozzle to casing joint.

15. Apparatus in a rocket motor arrangement comprising:
rocket motor arrangement sections,
a joint between the adjacent arrangement sections,
plural elastomeric O-ring seals positioned in the joint,
a source of high temperature combustion gas,
a porous flexible resilient thermal barrier including
　a uniaxial care having carbon fiber strands circumferentially adjacent one another in generally circular bundle,
　plural layered sheaths surrounding the core, wherein each sheath comprises carbon fiber strands wound in a braided configuration,
wherein the thermal barrier is positioned upstream of the O-ring seals, and wherein the thermal barrier provides thermal protection to the O-ring seals from the high temperature combustion gas.

16. The apparatus according to claim 15 wherein sheaths are intertwined.

17. The apparatus according to claim 15 wherein the braid angle of lay of the fiber strands with respect to the center of the core is in the range of 45–65 degrees.

18. A rocket motor assembly joint comprising:
a primary seal positioned between adjacent rocket motor sections,
insulation radially inwardly of the primary seal,
a cavity in the insulation,
a permeable thermal barrier including
　a core having elongated carbon fiber strands extending circumferentially adjacent to one another in a generally circular cross-sectional configuration,
　plural layered sheaths surrounding the core, wherein each sheath comprises carbon fiber strands wound in a braided configuration, and wherein the sheaths are intertwined,
wherein the thermal barrier is positioned in the cavity, and wherein the thermal barrier provides thermal protection to the primary seal.

19. The rocket motor assembly joint according to claim 18 including a layering of a lower sheath, a middle sheath, and an upper sheath, wherein the middle sheath is intertwined with the lower sheath and the upper sheath.

20. The rocket motor assembly joint according to claim 18 wherein the braid angle of lay of the fiber strands with respect to the center of the core is in the range of 45–65 degrees.

* * * * *